E. CICHY AND R. PESEK.
CALIPERS.
APPLICATION FILED NOV. 12, 1920.
1,435,630.
Patented Nov. 14, 1922.
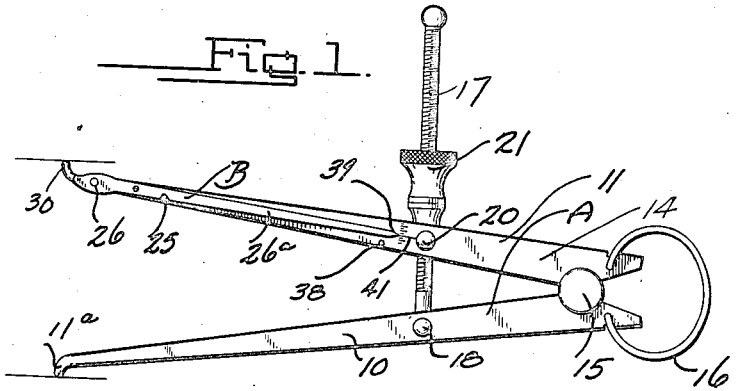
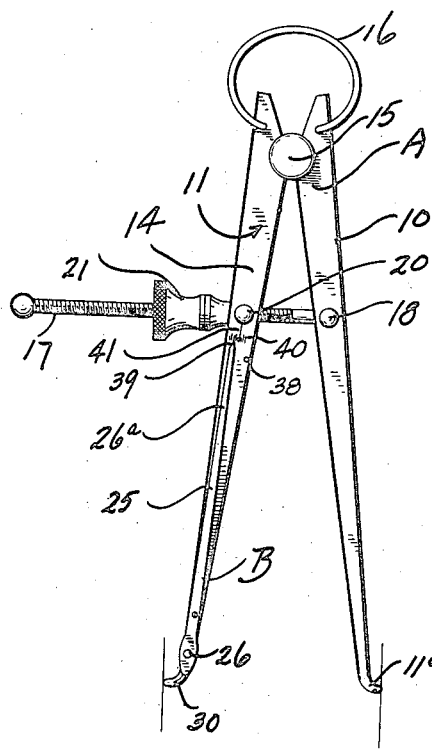
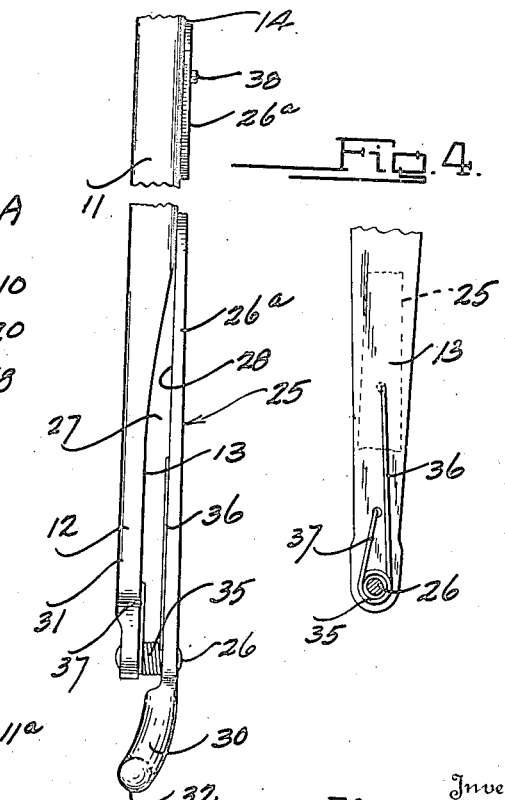
Inventors
Edward Cichy
Rudolf Pesek
By Lancaster & Allwine
Attorneys Patented Nov. 14, 1922.

1,435,630

UNITED STATES PATENT OFFICE.

EDWARD CICHY AND RUDOLF PESEK, OF CHICAGO, ILLINOIS.

CALIPERS.

Application filed November 12, 1920. Serial No. 423,628.

*To all whom it may concern:*

Be it known that we, EDWARD CICHY and RUDOLF PESEK, citizens of the United States, residing at Chicago, in the county of Cook and State of Illinois, have invented certain new and useful Improvements in Calipers, of which the following is a specification.

This invention relates to improvements in adjustable calipers.

An important object of the invention is the provision of a pair of adjustable calipers adapted to accurately determine by visible means any error which might exist in the dimensions of an object.

A further object of the invention is the provision of a pair of calipers in which it is merely necessary to set the same at a predetermined gage and the error between the set gage, and dimensions of an article will be visibly determined by an indicator arm upon the caliper.

A further object of the invention is the provision of a caliper of the above described character which is simple, easy of adjustment, and so compactly arranged as to present small opportunity of any disarrangement of parts.

In the accompanying drawings, forming a part of this specification, and in which like reference characters designate like parts throughout the same:

Figure 1 is a side elevation of the improved calipers showing the same registering a determined gage.

Figure 2 is a side elevation of the improved calipers showing the method of determining a discrepancy from a required gage.

Figure 3 is an enlarged fragmentary elevation showing several details of construction of the improved calipers.

Figure 4 is an enlarged fragmentary elevation, showing some of the details disclosed in Figure 3, and at right angles thereto.

In the drawings, wherein for the purpose of illustration is shown a preferred embodiment of our invention, the letter A designates a caliper, having the improved means B associated therewith for visibly determining an error in dimension from a required gage.

The caliper A comprises an ordinary caliper leg 10 having an engaging point 11ª upon one end thereof for the purpose of engaging an object to assist in determining its dimension. A second caliper leg 11 is provided for cooperating with the caliper leg 10 and preferably terminates short of the length of the caliper leg 10. The caliper legs 10 and 11 are preferably uniform in cross section, with the exception that the free end 12 of the caliper leg 11, is cut away upon one side thereof thus reducing materially in cross section, the free end 12 of the caliper leg 11, so that the plane of the reduced side 13 lies below the plane of the normal side 14 of the caliper leg 12, and in substantial parallel alignment therewith. The caliper legs are pivotally connected as at 15, in the ordinary manner; and in the form shown in the invention, namely a caliper for measuring inside dimensions, the spring 16 is provided for engaging the caliper legs 10 and 11 for normally forcing them apart. An adjusting screw 17 is pivotally carried by the leg 10, as at 18 and engages a rivet 20 or the like, mounted upon the caliper leg 11, having the adjusting nut 21 mounted thereon and in engagement with the adjusting screw 17 for expanding or contracting the caliper legs 10 and 11. However, it is to be understood that the improved visible means for determining a discrepancy in measurement, can be applied to an outside caliper as well, the application of the principle together with the construction being the results sought.

The improved means B of visibly determining an error in dimensions comprises a supplemental leg or arm 25, pivotally mounted as by a rivet 26 or the like, to the reduced end 12 of the caliper leg 11, and upon the terminal of said leg. The supplemental leg 25 includes an indicator 26ª extending upwardly from the pivot 26 and being relatively smaller in cross section than the cross section of the caliper leg 11 for abutting the same upon the reduced side at its normal cross section. By such arrangement of the caliper leg 11 and indicating arm 26ª, a recess 27 is thus provided intermediate the surface 28 of the indicating arm 26ª and the side 13 of the reduced end 12. The supplemental leg 25 also includes the engaging point 30 which extends outwardly from the pivotal connection 26, being greater in cross section than the cross section of the indicator arm 26ª and of such construction that it curves in compound manner outwardly and in the direction of the side 31 of the caliper, being the side opposite the side 14, and having the rounded surface engaging end 32 thereon. The engaging point 30 of the supplemental leg 25 is adapted for cooperation with the engaging point 11ª of the caliper leg 10, and the engaging point 30 is curved that the engaging points lie in substantially the same plane of movement. It is to be further noted that whereas the main caliper leg 11 is shorter than the caliper leg 10, the additional length provided by the engaging portion 30 provides that both of the engaging points 11 and 30 will contact on the same curve or arc struck from the pivot 15 of the legs 10 and 11.

In order to insure, that the supplemental leg 25 will at all times return to the same position a spiral spring 35 is disposed in the recess 27 intermediate the indicator arm 26ª and the reduced end 12 of the caliper leg 11 and preferably coiled about the pivot 26, having one end 36 thereof engaging the indicator arm 26ª and the opposite end 37 engaging the reduced end 12 of the caliper leg 11. The tendency of the spring is to normally force the indicator arm 26ª toward the caliper leg 10, and similarly to force the engaging point 30 outwardly from the caliper leg 10 by rocking the supplemental leg 25 upon the pivot 26. However, the movement of the indicator arm 26ª toward the caliper leg 10 is limited by a stop 38 positioned upon the side 14 of the caliper leg 11, and projecting upwardly to engage the free terminal of the indicator arm 26ª.

The free end 39 of the indicator arm 26ª is pointed and adapted to cooperate with the graduations 40 struck upon the side 14 of the caliper leg 11, thus providing a micrometer adjustment. In order to determine the dimension of an object, whether the same be correct or there is a discrepancy therein, the calipers legs 10 and 11 are adjusted by the screw 21 to their required gage, in such manner that the point 39 of the indicator arm 26ª coincides with the relatively large graduation mark 41 upon the caliper leg 11, as is clearly shown in Figure 1 of the drawings, the accurate or the set gage, then being the distance between the engaging points 11 and 30 of the caliper legs 10 and 11 respectively. In determining whether an article or object will register the set gage, the calipers are applied thereto and if the dimension is smaller than the set gage, the engaging point 30 will be somewhat depressed, rocking the indicator arm upon the pivot 26 and forcing the point 39 outwardly from the relatively long graduation 41 and the distance between the point 39 and relatively long graduation 41 will total the variance between the set gage and the smaller dimensions as is clearly shown in Figure 2 of the drawings. However, if the article or object to be measured has a dimension which is larger than the set gage, then the point 39 will of course swing upon the opposite side of the relatively long graduation mark 41, and the number of graduations intermediate the point 39 and long graduation mark 41 will of course register the discrepancy similar to that described above. It is to be noted that the distance from the pivot 26 to the point 39 is much greater than the distance from the pivot 26 to the end 32 of the gaging point 30, and which is provided for the purpose of leverage to render easy the visible determination of all variances in dimensions.

It is to be understood that the form of my invention herewith shown and described is to be taken as a preferred example of the same and that various changes in the shape, size and formation of parts may be made without departing from the spirit of the invention or the scope of the subjoined claims.

I claim:

1. In a caliper the combination, of a pair of caliper legs, one of said legs having an engaging point thereon, a supplemental leg pivoted to the second of said legs and having an engaging point adapted to cooperate with said first mentioned engaging point, and spring means disposed intermediate the facing surfaces of said supplemental leg and said second mentioned caliper leg for normally forcing said supplemental leg engaging point in one direction.

2. In a caliper, the combination, of a pair of caliper legs, one of said legs having an engaging point thereon, a supplemental leg pivoted to the second of said legs and having an engaging point adapted to cooperate with said first mentioned engaging point, and a spring coiled about said pivot, and engaging the supplemental leg for normally forcing the supplemental leg engaging point in one direction.

3. In a caliper, the combination of a pair of caliper legs, one of said legs having an engaging point thereon, the second of said legs having the free end thereof reduced in cross section by the cutting away of one side below the common plane of said side, a supplemental leg pivoted to said second mentioned leg adjacent the free end and facing the reduced side thereof, said supplemental leg comprising an engaging point adapted to cooperate with said first mentioned engaging point and an indicator arm adapted to overlie in abutting engagement the side of said second leg at its normal cross section and providing a space intermediate the indicator arm and reduced side of the caliper leg, and spring means disposed within said space and engaging said indicator arm for normally forcing the same in one direction.

4. In a caliper, the combination, of a pair of caliper legs, one of said legs having an engaging point thereon, the second of said legs having the free end thereof reduced in cross section by the cutting away of one side below the common plane of said side, a supplemental leg pivoted to said second mentioned leg, and near the end thereof in facing relation to the reduced side thereof, said supplemental leg comprising an engaging point adapted to cooperate with said first mentioned engaging point and an indicator arm adapted to overlie in abutting engagement the second mentioned caliper leg at its normal cross section, and providing a space intermediate the indicator arm and reduced side of the caliper leg, and a spiral spring coiled about said supplemental arm pivot, and disposed within said space and engaging the indicator arm and reduced side of the caliper leg to normally force the same in one direction.

EDWARD CICHY.
RUDOLF PESEK.